United States Patent
Pasupuleti et al.

(10) Patent No.: US 12,135,623 B2
(45) Date of Patent: *Nov. 5, 2024

(54) FAULT TOLERANCE IN SCALE-OUT DISTRIBUTED QUERY PROCESSING APPLIANCE

(71) Applicant: Oracle International Corporation, Redwood Shores, CA (US)

(72) Inventors: Krishna Kantikiran Pasupuleti, Belmont, CA (US); Boris Klots, Belmont, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/098,274

(22) Filed: Nov. 13, 2020

(65) Prior Publication Data

US 2022/0156163 A1    May 19, 2022

(51) Int. Cl.
*G06F 16/2453* (2019.01)
*G06F 11/20* (2006.01)

(52) U.S. Cl.
CPC .... *G06F 11/2025* (2013.01); *G06F 16/24537* (2019.01); *G06F 16/24542* (2019.01); *G06F 2201/80* (2013.01)

(58) Field of Classification Search
None
See application file for complete search history.

(56) References Cited

U.S. PATENT DOCUMENTS 5,907,849 A * 5/1999 Dias ............... G06F 11/2033
  714/E11.134
7,127,450 B1 * 10/2006 Chang ............... G06F 16/338
  707/999.005

(Continued)

FOREIGN PATENT DOCUMENTS

EP    2973054 A1    1/2016

OTHER PUBLICATIONS

Scrambling Query Plans to Cope With Unexpected Delays, Amsaleg et al.(Year: 1996).*

(Continued)

*Primary Examiner* — Augustine K. Obisesan
(74) *Attorney, Agent, or Firm* — Hickman Becker Bingham Ledesma LLP (57) ABSTRACT

In an embodiment, a computer-implemented method includes receiving a query from a client and determining a query plan for the query. The query plan comprises one or more query operators for executing at least a portion of the query on a database. The method also includes sending the one or more query operators to one or more computing nodes for the one or more computing nodes to execute the one or more query operators on one or more data fragments of the database. In this example, each computing node of the one or more computing nodes hosts a respective data fragment of the one or more data fragments. Further, the method includes detecting an error in executing a first query operator by a first computing node on a first data fragment, and sending, in response to detecting the error, the first query operator to a replacement computing node for executing on the first data fragment hosted by the spare computing node.

14 Claims, 6 Drawing Sheets

(56) References Cited

U.S. PATENT DOCUMENTS

| | | | |
|---|---|---|---|
| 7,933,872 B2 | 4/2011 | Kulkarni | |
| 8,849,767 B1 | 9/2014 | Zheng et al. | |
| 8,868,503 B1 | 10/2014 | Ravichandran et al. | |
| 9,053,167 B1 | 6/2015 | Swift et al. | |
| 9,069,827 B1 | 6/2015 | Rath et al. | |
| 9,087,076 B2 | 7/2015 | Nickolov | |
| 9,489,443 B1 | 11/2016 | Muniswamy-Reddy et al. | |
| 9,600,500 B1 | 3/2017 | Gupta et al. | |
| 10,303,555 B1 | 5/2019 | Lee | |
| 10,691,637 B2 | 6/2020 | Badey | |
| 2004/0098371 A1* | 5/2004 | Bayliss | G06F 16/2471 |
| 2005/0154740 A1* | 7/2005 | day | G06F 16/24549 |
| 2005/0246397 A1 | 11/2005 | Edwards et al. | |
| 2009/0132541 A1 | 5/2009 | Barsness et al. | |
| 2012/0144234 A1* | 6/2012 | Clark | G06F 11/0727 |
| | | | 714/16 |
| 2012/0203742 A1 | 8/2012 | Goodman | |
| 2013/0212070 A1 | 8/2013 | Saika | |
| 2013/0262805 A1 | 10/2013 | Zheng et al. | |
| 2014/0164353 A1 | 6/2014 | Shankar et al. | |
| 2014/0164388 A1* | 6/2014 | Zhang | G06F 16/93 |
| | | | 707/742 |
| 2014/0310258 A1* | 10/2014 | Tian | G06F 16/2471 |
| | | | 707/718 |
| 2015/0370856 A1* | 12/2015 | Johnson | G06F 16/282 |
| | | | 707/736 |
| 2016/0292041 A1 | 10/2016 | Bender | |
| 2017/0075946 A1* | 3/2017 | Bossa | G06F 16/2471 |
| 2018/0039534 A1 | 2/2018 | Cai et al. | |
| 2018/0121326 A1* | 5/2018 | Qi | G06F 11/3636 |
| 2018/0121455 A1 | 5/2018 | Eda et al. | |
| 2019/0146970 A1* | 5/2019 | Chamieh | G06F 16/24542 |
| | | | 707/718 |
| 2021/0365456 A1* | 11/2021 | Kondiles | G06F 16/248 |
| 2022/0129358 A1 | 4/2022 | Pasupuleti et al. | |

OTHER PUBLICATIONS

Woloszyn, "Trivial File Transfer Protocol (TFTP)", Politechnika Radomska, Polska, Year 2012, 10 pages.

Thomson et al., "CalvinFS: Consistent WAN Replication And Scalable Metadata Management For Distributed File Systems", https://www.usenix.org/conference/fast15/technical-sessions/presentation/thomson, Year 2015, 15 pages.

Suel et al., "Improved File Synchronization Techniques for Maintaining Large Replicated Collections over Slow Networks", CIS Department, Polytechnic University, http://rsync.samba.org/, Year 2004, 12 pages.

Siegel et al., "The Tapis Approach to Informal File Systems and Remote Data Access", Department of Computing Science, University of Alberta, Year 2002, 11 pages.

Mashtizadeh et al., "Replication, History, and Grafting In The Ori File System", http://dx.doi.org/10.1145/2517349.2522721, Year 2013, 16 pages.

Liskov et al., "Replication In The Harp File System", Proceedings of the Thirteenth ACM Symposium on Operating Systems Principles, Year 1991, 25 pages.

Kelly, "Good Old-Fashioned Persistent Memory", Winter 2019, vol. 44, No. 4, www.usenix.org, Year 2019, 6 pages.

Irmak et al., "Improved Single-Round Protocols For Remote File Synchronization", CIS Department, Polytechnic University, Year 2005, 12 pages.

Carns et al., "Object Storage Semantics for Replicated Concurrent-Writer File Systems", Argonne National Laboratory, Year 2010, 10 pages.

Allcock et al., "Protocols and Services for Distributed Data-Intensive Science", Year 2001, 3 pages.

Pasupuleti, U.S. Appl. No. 17/077,028, filed Oct. 22, 2020, Non-Final Rejection, Feb. 11, 2022.

Pasupuleti, U.S. Appl. No. 17/077,028, filed Oct. 22, 2020, Final Rejection, Jun. 2, 2022.

Pasupuleti, U.S. Appl. No. 17/077,028, filed Oct. 22, 2020, Notice of Allowance and Fees Due, Aug. 17, 2022.

Wang, U.S. Appl. No. 17/502,855, filed Oct. 15, 2021, Notice of Allowance and Fees Due, Oct. 25, 2023.

\* cited by examiner

FAULT TOLERANCE IN SCALE-OUT DISTRIBUTED QUERY PROCESSING APPLIANCE

FIELD OF THE INVENTION

The present invention relates to offloading of database query execution, and more particularly, to techniques to transparently resubmit a query for re-execution when there is an error in processing the query.

BACKGROUND

Scale-out systems are becoming increasingly important for enterprise computing. As the scale and the size of such systems grow, the number of hardware and software components also grows. In systems including a large number of components, e.g., processor cores, typical hardware hardening approaches have been unsatisfactory in keeping up with the growth of failure rates. The growth of the number of hardware and software components might also lead to decreased mean time between failures. This trend is aggravated by the economics of large in-memory systems that tends to result in using memory components with failure characteristics that are generally weaker than more traditional upscale memory components. Consequently, large scale-out systems need to address the confluence of high-level trends that jeopardize system availability—individual components that are generally more prone to failures, and the relatively higher probability of failure within the system due to a large number of components.

An approach to address such challenges is to maintain multiple replicas of the data within the system, and to control re-starting of tasks (e.g., query processing) at the application level. In this approach, when a failure occurs while processing a query, the system sends an error for the query to a client application. The system thereby relies on application logic to correctly handle the error and properly resubmit the query. In such a case of application-level re-submissions, the success of recovery depends at least in part on the quality of the application logic, which is generally an undesirable standard to use in enterprise-level systems. Further, in an interactive system, a user may need to resubmit the query via a query client. Frequent resubmits, however, negatively affect user experience of interactive users.

DETAILED DESCRIPTION

In the following description, for the purposes of explanation, numerous specific details are set forth in order to provide a thorough understanding of the present invention. It will be apparent, however, that the present invention may be practiced without each and every of these specific details. In other instances, well-known structures and devices are shown in block diagram form in order to avoid unnecessarily obscuring the present invention.

General Overview

Techniques disclosed herein may be implemented by a computing system to better perform fault processing and recovery actions when there is an error or failure in execution of a database query. The disclosed fault processing techniques further help to improve fault tolerance, support high availability (HA), and automate transparency to enhance user interaction and convenience in a computing system configured for query processing, such as a large scale-out system.

Fault processing techniques disclosed herein address the issue of transparency (transparent re-submission and re-execution of queries) at a query-execution level rather than at a client-application level. A computing system may implement the disclosed fault processing techniques to perform recovery actions without communicating an error to a query client. The computing system performs recovery actions in an automated fashion transparently to the query client, which remains (in many cases) unaware of a failure. Accordingly, the fault processing techniques help to significantly improve behavior of scale-out systems by making many query failures invisible to interactive users and client applications. This advantage becomes increasingly beneficial for large scale-out systems, in which a mean time between failures contracts as the number of system components grows.

In an embodiment, a computing system including a database management system (DBMS) is configured to execute a foreground process that submits a query to an analytical query processing system comprised of multiple processing or computing nodes. The computing nodes host fragments of a database, upon which query is executed. Different nodes may host different data fragments of the database and together (as a union of data fragments) the nodes host the whole relevant database.

The DBMS pushes a query to relevant nodes. Each node processes the query, or a portion thereof, based on a data fragment that a respective node hosts, and generates a result data set based on executing the query on the respective data fragment. Each node sends or returns its respective result data set to a DBMS process or function that initiated the query push to the node. Generally, the foreground process of the DBMS receives result data sets from each node separately, and sends the result data sets to a query client that submitted the query for processing. The DBMS is configured to send a single correct and complete result data set exactly once to the query client. In sending the correct and complete result data set, the DBMS is configured to avoid releasing duplicate tuples of the result data set and to avoid losing any tuple of the result data that should be provided to the query client. The DBMS, however, may release portions of the result data set to the query client at different times as long as the correct and complete result data set is sent just once to the query client.

Fault processing techniques disclosed herein perform transparent re-submission and re-execution of a query when an error in executing the query is detected. A complexity arises in such a situation, however, because the DBMS may receive a stream of result data from one or more computing nodes, and the DBMS may be configured to release partial result data to another operation or function (e.g., a parent operation), or to the query client without waiting for a complete set of result data to be available. Consequently, when DBMS resubmits a query for re-execution, the DBMS may receive duplicate result data from re-executing the query. Fault processing techniques disclosed herein help to address the issue in order to still send a single correct and complete result data set to the query client.

In an embodiment, the DBMS maintains a set of buffers that hold result data received from computing nodes. The DBMS is configured to execute a background process that monitors the analytical query processing system and the computing nodes for faults or errors in the system like, for example, a node failure. The background process communicates a failure among the computing nodes to the foreground process. In response to detecting an error, the foreground process resubmits the query to the analytical query processing system while considering result data already received from the computing nodes. As computing nodes of the analytical query processing system re-execute the resubmitted query, DBMS determines if any result data should be discarded or otherwise disregarded from re-execution of the query. For example, DBMS may have already released result data received from one or more of the computing nodes in a prior execution, and so should disregard the released result data in a subsequent execution. The foreground process resubmits the query without notifying the query client of the error. The re-submission of the query is thereby transparent to the query client.

In an embodiment, to resubmit the query, the foreground process determines a logical node associated with a computing node that experienced the error, and determines a respective data fragment hosted by the computing node that experienced the error in executing the query on the respective data fragment. The foreground process identifies a replacement computing node and associates the determined logical node with the replacement computing node. The foreground process sends to the replacement computing node the query, or a respective portion thereof, and the respective data fragment if the replacement computing nodes does not already host the respective data fragment.

In an embodiment, the query is a deterministic query. Each time a deterministic query is submitted for execution, each node executing the query on a respective data fragment produces a result data set with the same membership or records, although the order of records within a result data set may be different. To help maintain the same result data sets across executions of a query, the DBMS is configured to utilize, in each query execution, the same number of logical nodes and each logical node operating on the same respective data fragment.

Example Distributed System

Figure 1:
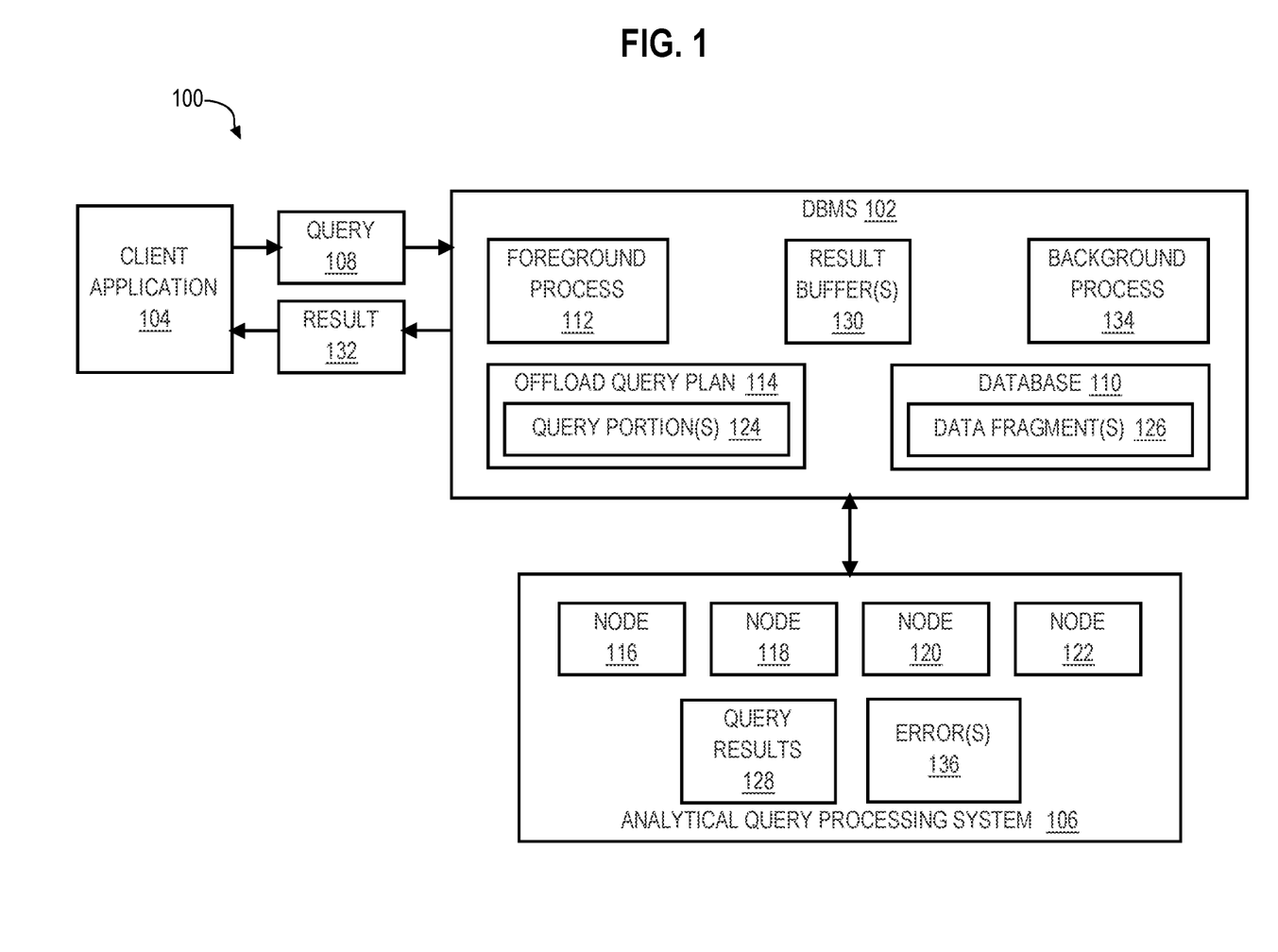
FIG. 1 is a block diagram that illustrates a distributed system configured for offloading of database query execution, according to an embodiment.

FIG. 1 is a block diagram that illustrates an example distributed system 100 configured to offload database query execution and, when an error in executing a query occurs, to accelerate re-submission of the query by replacing a failed computing node with a hot spare computing node. A hot spare is a computing node that can be converted from a spare to an active participant without human intervention nor system downtime.

Distributed system 100 includes database management system (DBMS) 102 communicatively coupled via a communication network to client application or query client 104 and to analytical query processing system 106. In operation, DBMS 102 receives query 108 to be executed on database 110 to analyze and/or retrieve data therefrom. DBMS 102 hosts database 110, which may be a bulk datastore such as a relational database. Data stored in database 110 may reside in volatile and/or nonvolatile storage. In various embodiments, query 108 is expressed as data manipulation language (DML) such as a create read update delete (CRUD) statement or query by example (QBE). Query 108, for instance, may be a structured query language (SQL) DML statement. In an embodiment, query 108 is received through open database connectivity (ODBC).

In an embodiment, DBMS 102 includes foreground process 112, which performs functions including generating offload query plan 114 based at least in part on query 108, and offloading execution of offload query plan 114 to query processing system 106. Query processing system 106 includes computing nodes 116, 118, 120, 122, each of which may be a processor or computing component implemented on a server, a personal computer, a mainframe, a virtual computer, or other computing device.

Nodes 116-122 are configured to execute one or more query operators or query portions 124 of query 108 in accordance with offload query plan 114. In an embodiment, DBMS 102 divides data in database 110 into one or more data fragments 126, and sends the one or more data fragments 126 to nodes 116-122. DBMS 102 may divide and load data fragments to nodes as part of an initialization process that is potentially separate from foreground process 112, for instance. In operation, each node 116-122 then hosts a respective data fragment, and executes one or more query portions 124 on the respective data fragment 126 to in turn generate query results 128. Nodes 116-122 return respective query results 128 to DBMS, which holds query results 128 in one or more result buffers 130. When a result data set in result buffers 130 is ready to be released, DBMS returns result data sets 132 to client application 104.

Result buffers 130 are not necessarily additional resources that consume space. Rather, a result buffer may be a modified version of a network buffer used by a row source function and designed to hold data that is sent by computing nodes before result data is released to a parent row source function. Generally, network buffers are zero-copy buffers used by a row source function while polling network queues for result data from analytical query processing system 106.

DBMS 102 includes background process 134, which performs functions including monitoring query processing system 106 and nodes 116-122 for faults or errors 136 in processing or executing query 108 and re-loading data fragments 126. In response to detecting an error 136, DBMS 102 resubmits a query portion 124 of query 108 and data fragment 126 for execution on a replacement node.

Query Planning

DBMS 102 analyzes query 108, such as during query planning, to determine portions of query 108 that DBMS 102 may offload to nodes 116-122 for accelerated execution with horizontal scaling. In an example, nodes 116-120 may be used as participating nodes during an initial query execution, and node 122 is reserved as a spare node to replace a failed participating node. These designations may change upon DBMS 102 detecting an error in executing a query and resubmitting the query to a replacement node, as described in more detail hereinafter.

Figure 2:
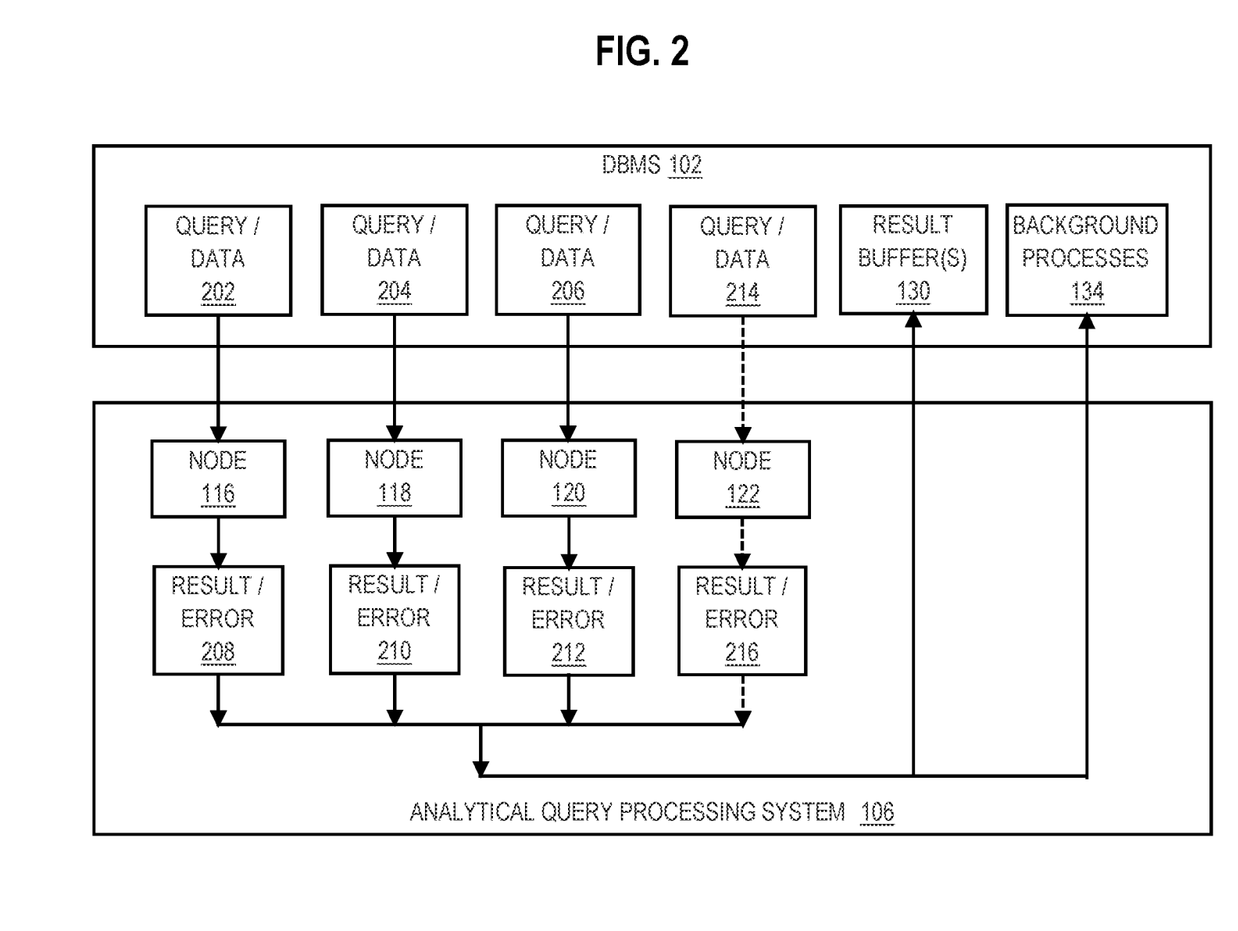
FIG. 2 is a block diagram that illustrates additional details of the distributed system of FIG. 1, according to an embodiment.

As a preface to offloading, DBMS 102 is configured to generate offload query plan 114 for participating nodes 116-120. Offload query plan 114 may specify one or more query portions 124 of query 108 to be executed on one or more data fragments 126 of database 110. With further reference to FIG. 2, which illustrates additional details of distributed system 100 of FIG. 1, DBMS 102 is configured to send respective query portions 124 and data fragments 126, which are illustrated by query/data blocks 202, 204, 206, to participating nodes 116-120. In operation, DBMS 102 may send respective query portions 124 and data fragments 126 together or separately to participating nodes 116-122.

Query planning may be considered a preparatory phase of query execution that generates query plan 114, which determines how execution of query 108 should be implemented. The query planning phase may be regarded as a linear process that generates, in the following ordering, the following artifacts in sequence such that a next artifact is generated based on a previous artifact: a) a parse tree of query 108 that may be an initial query plan that is independent of hardware and composed of relational operators that manipulate database data, such as according to relational algebra; and b) a pair of cooperating query plans, including an optimized query plan for execution by DBMS 102 and offload query plan 114 for offloaded execution of query 108.

The cooperating query plans need not be individually capable of entirely executing query 108 so long as both query plans cooperate to fulfill the query. For example, an initial query plan may be a parse tree of query 108, and a subtree of the initial query plan may be designated as offload query plan 114. In an example, multiple subtrees of the initial query plan may be designated as multiple offload query plans to be concurrently or sequentially offloaded for execution. The remainder of the initial query plan, without the offloaded subtree(s), becomes a query plan for DBMS 102.

In any case, the query plan for DBMS 110 and/or offload query plan 114 may be optimized and/or compiled. In one example and according to offload query plan 114, participating nodes 116-120 do or do not cooperate with each other and cooperate with an optimized query plan that DBMS 102 executes.

Figure 3:
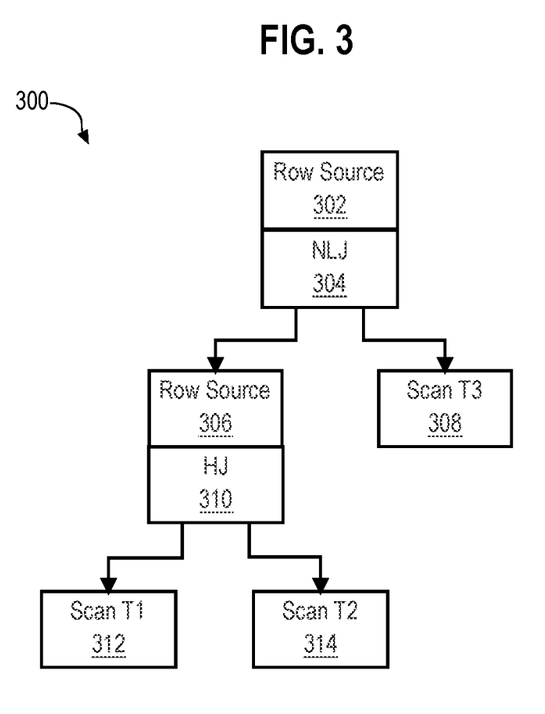
FIG. 3 illustrates an example query plan tree.

In an embodiment, offload query plan 114 represents query 108 with a graph of interlinked blocks. FIG. 3 illustrates an example query plan 300 as a graph or directed tree, in which blocks 302-312 represent query operators, such as a row source. Generally, a query operator comprises one or more routines or functions that are configured for performing operations on input rows or tuples to generate an output set of rows or tuples. The operations may use interim data structures. Output set of rows or tuples may be used as input rows or tuples for a parent operator. An operator may be executed by one or more computing nodes. Referring to an operator as performing an operation means that a computing node executing functions or routines of an operator are performing the operation. Generally, a row source is a more particular function or object responsible for retrieving input rows from a source, such as from a table or from a join operation, and generating output rows from the input row. The output rows may be new rows, and/or a version of the input rows that have been transformed by the row source. Output rows generated by a row source may serve as input rows to another (parent) row source.

When DBMS 102 begins query execution, each row source is started once when it initializes execution structures and sets up metadata information. Starting from the top of a query plan, each row source is fetched from recursively multiple times until the entire result of the query is consumed and closed at the end of execution. Each fetch of any row source returns a set of rows to its parent row source. Once result rows reach a root in the query plan tree, result rows are returned to the client application.

A hierarchy of query plan 300 represents an order in which blocks 302-314 are performed and how data flows between blocks 302-314. According to example query plan 300, DBMS 102 executes row source 302 to perform nested loop join (NLJ) 304 based on data from row source function 306 and a scan 308 of table T3. DBMS 102 executes row source 306 to perform hash join 310 based on result data from scan 312 of table T1 and scan 314 of table T2.

In an embodiment, row source 306 is considered as a special row source that receives partial result data from computing nodes of analytical query processing system 106, holds the result data in result buffers 130, constructs a complete result set from the result data in the result buffers and results received from re-execution of a query, and controls release of result data to a parent operator or to client application. Generally, blocks in a query plan that are downstream or below a special row source are offloaded to one or more computing nodes (e.g., computing nodes 116-122) of analytical query processing system 106. During query execution by DBMS 102, the special row source is considered an entry point to query execution by analytical query processing system 106, and is the point where query offload and retrieval of results occurs. Fetching from a special row source starts query execution on analytical query processing system 106 for the subplan that is under the special row source. Upon receiving the result data from one or more computing nodes of the query processing system, the row source constructs row vectors in the form that can be consumed by a parent function and returns a set of result rows to the parent function.

In the present example, DBMS 102 loads portions or data fragments from tables T1, T2 to computing nodes of analytical query processing system 106. The one or more computing nodes perform scans 312, 314 on respective data fragments hosted by the nodes to generate respective result data. The one or more computing nodes may also perform hash join 310 on the respective result data and return results of the hash join to row source 306. Alternatively or in conjunction, DBMS 102 may perform hash join 310 or other processing on respective result data received from the one or more computing nodes.

Data Portions

Depending on the scenario, data fragments 126 of database 110 may be various subdivisions of content of database 110, such as non-overlapping data partitions, partially overlapping partitions, or data replicas. For example, data fragments 126 may be horizontal partitions composed of mutually exclusive subsets of rows of relational table(s) or rows of tabular intermediate results generated locally by a participating computing node or intermediate results received from a generating other participating computing node.

For example, offload query plan 114 may specify a sequence of processing phases that each participating node 116-120 should execute as discussed further herein, including: a) receiving a respective portion of database 110 into volatile or nonvolatile storage or as a stream of individual or batches of tabular input rows; b) processing the input rows to generate output rows; c) retaining the output rows locally for further processing according to offload query plan 114; d) sending the output rows to DBMS 102 as query results 128; and/or e) sending respective portions of the output rows to other participating computing nodes for further processing according to offload query plan 114.

Each participating node 116-120 concurrently executes offload query plan 114 to generate a respective structurally similar local result. FIG. 2 illustrates that each node 116-122 may generate its own respective results, which are shown together with error or fault data in result/error blocks 208, 210, 212, 216. Query results may be a set of one or more scalar values. For example, a query result may be tabular, such as a row set or a set of columnar vector(s). When data fragments 126 are horizontal partitions, query results from different computing nodes 116-122 may be structurally similar such as similar row sets having same columns but different amounts and values of data. For example none, some, or all query results 128 of nodes 116-122 may be empty.

Fault Tolerance

During distributed execution of offload query plan 114, any of participating nodes 116-120 may fail. In an example, participating node 116 experiences a failure in executing query plan 114. Non-limiting examples of failures at a computing node include a software crash of a computer program, an operating system failure such as a kernel panic, a hardware failure such as a disk crash, a parity error, or a power outage. A software crash may be caused, for example, by a null pointer, violation or exhaustion of an address space, or a timeout such as due to a synchronization deadlock or an infinite loop.

When participating node 116 fails, some approaches may abort or abandon query 130, fail an atomic consistent isolated durable (ACID) transaction or any other transaction that includes query 108, and/or report a timeout or other error to client application 104. These approaches request the client to determine how to recover from the failure of query 108, such as by resubmitting the query, in which case in-progress work of query 108 may be lost and execution of query 108 restarted. Distributed system 100 can avoid such penalties by utilizing fault tolerance techniques disclosed herein.

Distributed system 100 contains various computing nodes, one or more of which are designated as spare computing nodes (e.g., node 122). A spare computing node may not ordinarily receive a query plan for executing query 108 on database 110, and accordingly may not ordinarily generate a partial result. Depending on the embodiment or scenario during offloaded execution of query 108, any of one or more spare nodes may be idle, may contribute to offloaded execution of query 108 in an ancillary way that does not entail a query plan (e.g., by caching original data or intermediate results), and/or may receive and execute a query plan for a different query or query portion. In an embodiment, a spare node does not receive and execute query plans for any queries unless replacing a failed node. In another embodiment, a spare node simultaneously is a participating computing node for one query and a spare computing node for another query. In a further embodiment, a spare node is considered a hot spare node, because the node may passively stand-by while waiting for a participating node to fail.

In an example, DBMS 102 detects that an error or failure has occurred in participating node 116 executing query plan 114 (or one or more query portions 124) on database 110 (or one or more data fragments 126), i.e., that participating node 116 has failed. In response to detecting the failure, DBMS 102 selects computing node 122 to replace failed node 116, and DBMS 102 sends a query portion 124 and data fragment 126 (e.g., query/data block 214 of FIG. 2) to replacement computing node 122 for execution. In an embodiment, replacement computing node 122 receives and executes the same query plan or portion and receives the same data fragment as failed node 116. Computing node 122 then ceases to be a spare node and instead becomes a participating node that replaces failed node 116.

No matter which of nodes 116, 122 fully executes query plan 114, and no matter which of nodes 116, 122 generates and sends results to DBMS 102, query result (e.g., in blocks 208, 216 of FIG. 2) will be identical or logically equivalent. For example if ordering of values or rows in query results 128 is significant, then either of nodes 116, 122 is configured to generate a same ordering. If values or rows in query results 128 may be unordered, then ordering may depend on which of nodes 116, 122 generates the query results 128 or may be arbitrary.

When participating node 116 fails, DBMS 102 does not need to regenerate query plan 114, but can reuse query plan 114 as is, so long as a spare node is available to replace failed node 116. In other words, offload query plan 114 is portable such that its execution with a data fragment 126 can be attempted and reattempted on any number of computing nodes, and at some point a computing node will succeed at executing offload query plan 114 on the data fragment 126. Thus, distributed system 100 has fault-tolerant query processing.

Example Fault Tolerance Process

Figure 4:
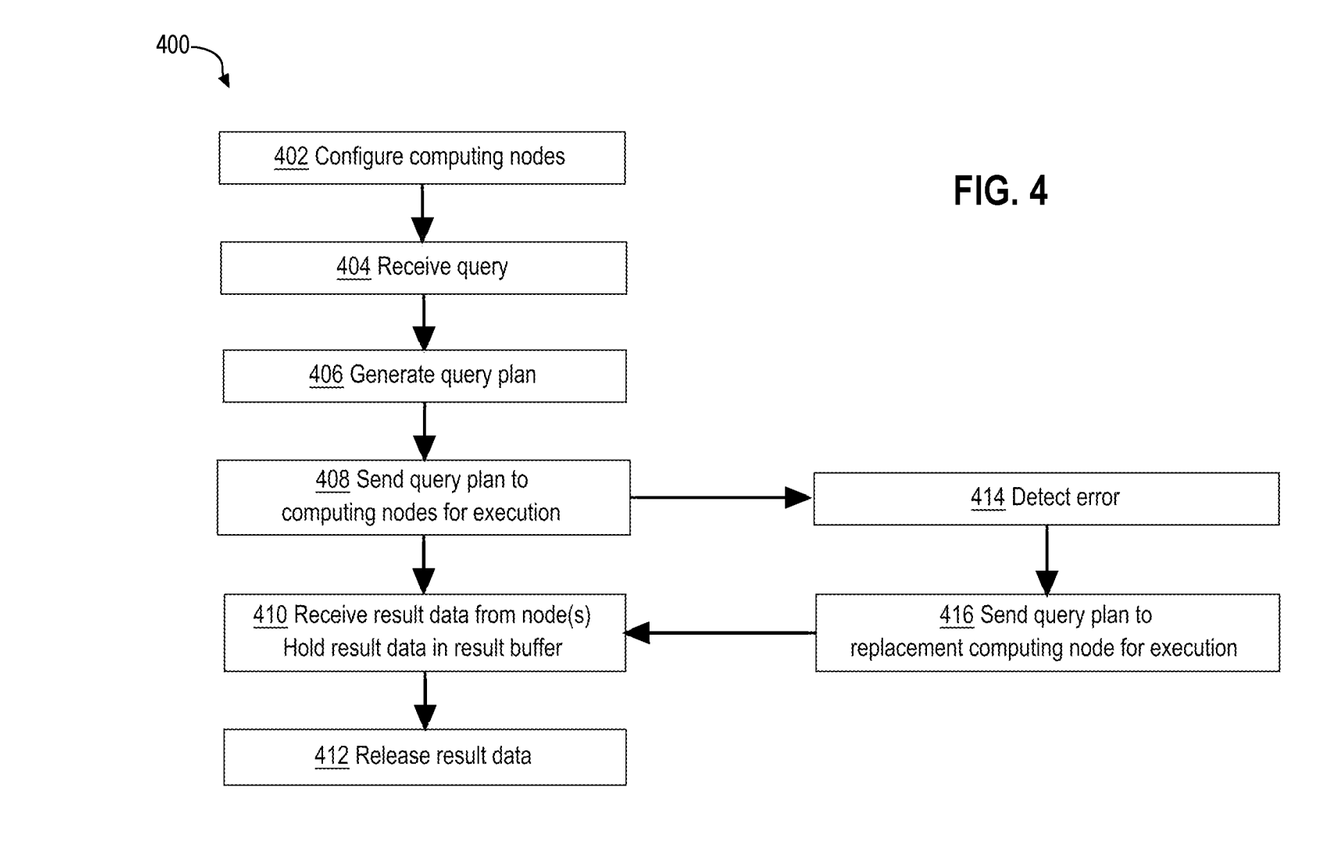
FIG. 4 is a flow diagram of example fault processing techniques, according to an embodiment.

FIG. 4 is a flow diagram 400 that depicts an example process that distributed system 100 may perform to restart distributed execution of offload query plan 114, including replacing failed computing node 116 with computing node 122. Processes of flow diagram 400 may be performed or executed by distributed system 100, for example.

At block 402, distributed system 100 configures or initializes the system to process and execute queries 108 using DBMS 102 and analytical query processing system 106. In an embodiment, at block 402, distributed system 100 performs one or more of configuring computing nodes 116-122 as participating nodes and/or spare computing nodes, associating physical computing nodes with logical nodes, identifying result buffer network addresses, allocating result buffers 130 to nodes, and maintaining state machines for result data sets from the computing nodes. Distributed system 100 is also configured to adjust such configurations as other processes are performed.

In an embodiment, DBMS 102 creates an identifier map that is a bidirectional mapping of physical identifiers of computing nodes to logical node identifiers of participating nodes. For example, a physical identifier may comprise a host identifier such as an internet protocol (IP) address or a host name, or a uniform resource locator (URL) that contains a host identifier. A logical node identifier may be an integer such as a serial number or an array offset. Thus, no matter how complex are physical identifiers, such as for network transport, query plan 114 may refer to a set of participating nodes by a set of logical node identifiers, for instance, a sequence of numbers from 1 to 1,000. DBMS 102 may send copies of the identifier map to participating nodes 116-120 for retention and use during distributed query execution.

At block 402, DBMS 102 allocates separate result buffers 130 for each logical computing node. These result buffers 130 hold result data sets returned by a respective node. Result buffers 130 can be allocated either completely within memory of DBMS 102 or foreground process 112, or the buffers can be distributed. In a distributed buffer model, buffering of result data sets happens (completely or partly) on the computing node that generates a result data set.

To help manage result buffers 130, DBMS 102 employs various techniques that allow a row source function to identify a boundary of result rows that have been received. Techniques to allow such identification include, for instance, transparent sorting of data by each computing node before result data is sent to DBMS, and maintaining information regarding ranges of "rowids" or other unique identifiers like a primary key of the result set from each computing node.

A result data set from a computing node may be referred to as a Node Result Set (NRS), and a result data set from a particular computing node (X) may be referred to as NRS (X). Every chunk of data that is sent by a computing node through a network to DBMS is accompanied by information for the NRS (e.g., header information), which may include one or more of a logical node identifier associated with a computing node that generated the NRS, an identifier of a query plan or query portion executed by the computing node, ranges of rowids for respective data fragments and/or result data, primary keys or other sort information, a network address of an associated result buffer, data dictionaries for decoding, threshold limits for result data, and state machines that identify a state of NRS.

DBMS 102 maintains state machines for each node to identify a state of result data sets (NRS) from a respective node. The state of a result data set is initialized with a state that no result has been received yet from a computing node. When result data is received, DBMS 102 updates the state of a result data set to indicate that the result data set is being populated. DBMS 102 also updates the state of a result data set to indicate whether result data has been sent to a parent computing node or to client application 104 either before or after an end of transmission or end of result set (EOT) flag or information has been provided by a respective computing node. DBMS 102 may also maintain the state of a result data set to indicate a global or local sort order, as needed or desired. For instance, if NRS(X) has an order (sorted on a key), a per-node watermark may indicate a largest (or smallest) key of the row already returned to a parent row source.

If NRS has a global sort order (either because the query itself has an "order by" clause, or the analytical query processing system sorts the result globally among various computing nodes before sending result data to the foreground process, it may not be necessary to segregate result rows by a logical node identifier. In this case, a single result buffer may suffice along with information on the largest (or smallest) key of the result that was released.

At block 404, DBMS 102 receives query 108 of database 110. At this point, query 108 does not reference computing nodes 116-122. At block 406, DBMS 102 generates offload query plan 114 from query 110. Offload query plan 114 may be based at least in part on a count of participating nodes 116-120. In some embodiments, DBMS 102 may change a configuration from block 402 of computing nodes 116-122 as participating and/or space computing nodes based on query plan 114. In an embodiment, offload query plan 114 includes logical node identifiers of participating computing nodes used to execute the query plan. For a given query plan, logical node identifies used to execute the plan do not change across node failures and query re-submissions. Query plan 114 is thereby insulated from changes in physical node information, which occurs when a spare computing node replaces a failed computing node, for instance. Generally, offload query plan 114 need not or does not contain: a) physical identifiers of participating computing nodes, nor b) references to data fragments of database.

In an example, distributed system 100 configures participating nodes 116-120 to receive and execute offload query plan 114, and computing node 122 as a spare node awaiting conversion to replace a failed node. At block 408, DBMS 102 sends offload query plan 114, or one or more query portions 124 thereof, and a respective data fragment 126 of database 120 to each participating node. According to an example, DBMS 102 at block 408 does not send offload query plan nor data fragments to spare node 122. In various embodiments, participating nodes 116-120 receive respective data fragments (e.g., data blocks 202-206) entirely or in parts as individual or batches of tabular rows in respective streams. In an embodiment, participating nodes may be diskless and lack nonvolatile storage for data fragments, in which case participating nodes store data fragments in volatile storage.

DBMS 102 may compile offload query plan 114 before sending, or participating nodes 116-120 may compile the offload query plan 114 after being received or may execute the offload query plan without compilation. In any event, in response to receiving query plan 114 and data fragments 126, participating nodes 116-120 execute query plan 114 on respective data fragments 126 to generate result data.

At block 410, DBMS 102 receives result data from participating nodes, and holds received result data in result buffers 130 allocated to the participating nodes. DBMS 102 may segregate result data from different participating nodes using logical node identifiers associated with a respective computing node that sent the result data. A computing node may be configured to send a message to a row source function of the DBMS when the node completes production of its result data set from executing the query on a respective data fragment. This message may include an EOT flag, for example, that accompanies the result data received at block 410, and is used to inform foreground process 112 that the result data set from the computing node is ready and complete.

At block 412, DBMS 102 releases one or more portions of received result data sets to one or more of a parent node in query plan 114 or to client application 104. In an embodiment, DBMS 102 determines that at least one condition has been satisfied in relation to a given result data set to trigger release of the given result data set. The at least one condition may include, for instance, having received from a corresponding computing node an EOT message or other information indicating that the given result data set is complete. The at least one condition may also be satisfied if one or more of a memory threshold, volume threshold, or a time threshold has been exceeded. More particularly, DBMS 102 may release a received portion of result data sets before a given result data set is complete if a predetermine time limit (e.g., after DBMS received a query or after DBMS sent query plan to computing nodes) has been exceeded. DBMS 102 may also release a received portion of result data sets if stored or buffered result data sets exceed a memory limit based on predetermined units of memory space, for instance. In another example, DBMS 102 may release a received portion of result data sets when the received portion exceeds a predetermined percentage of estimated result size from a given computing node. Generally, the result size for each node may be available in a header of a data packet sent from a respective node.

DBMS 102 may further consider deterministic characteristics of result data sets in managing release of result data. Some queries when executed by analytical query processing system return the same set of rows, although possibly in different orders, from each computing node across different query executions, query re-submissions, and query re-executions. Such queries are considered "deterministic" and are well-suited for processing using the present techniques. DBMS 102 helps to implement deterministic queries by using the same logical nodes across query executions on the same data fragments. There are different levels of query determinism that impact the release of result data.

More particularly, when data rows of NRS(X) are the same across different query executions, but an order of data rows within each NRS(X) is not guaranteed, then DBMS 102 may hold result data sets NRS(X) until the result set is complete, e.g., EOT is received. Alternatively, DBMS 102 may release, before EOT is received, ranges of rows of NRS(X) and track the released rows by rowed ranges, primary key column, etc.

When NRS(X) is the same and guaranteed to be ordered across different query executions, DBMS 102 may stream result data from the result buffers to a parent row source. In this case, DBMS 102 tracks a key of the last returned row for each computing node, so that upon re-submission and re-execution of the query the appropriate result rows can be ignored. Generally, even if a query does not have an ORDER-BY clause, the computing nodes may sort result data sent to the foreground process and communicate sort information via a metadata header of the result data.

When a total NRS across all nodes is ordered, DBMS 102 may ignore results from nodes with keys within a per-node watermark irrespective of the node the results came from.

Upon releasing result data, DBMS marks the released result data set from a particular node as having been released to the query client, for instance, by updating the state of the result data set from the particular node. The foreground process may release to the query client a result data set from each node independently and upon completion of processing from a respective node and/or upon determining that a condition has been satisfied.

At block 414, DBMS 102 or background process 134 detects that a participating node (e.g., node 116) has encountered an error or failure in executing query plan 114. DBMS 102 may detect an error in various scenarios. For instance, DBMS 102 may detect an error when a threshold amount of heartbeats are not received from a participating computing node. In another example, DBMS 102 may detect and error when there is a loss of a network connection with the participating node. Background process 134 of DBMS 102 is configured to monitor heartbeats and connections for all participating nodes. In an embodiment, such monitoring may be performed by a separate computing device for each failure domain, such as a respective monitor computing device for a network switch coupled to nodes 116, 122, and for another network switch coupled to nodes 118, 120. Monitoring computing devices may relay status of participating nodes to DBMS 110.

In various scenarios, when computing node 116 fails, none, some, or all of other participating nodes 118, 120 are configured to: a) detect that participating node 116 failed and abort execution of offload query plan 114; b) are directed by DBMS 102 to abort execution of offload query plan; c) continue execution of offload query plan; and/or d) have already finished execution of offload query plan.

In response to detecting a failure of participating node 116, DBMS 102 at block 416 sends the same offload query plan 114 and same data fragment 126 of failed node 116 to replacement node 122 for execution. According to an embodiment, foreground process 112 is configured to send same offload query plan 114 to failed node 116, and background process 134 is configured to re-load same data fragment 126 to failed node 116. At block 416, DBMS 102 may also direct surviving participating nodes 118, 120 along with replacement node 122 to restart execution of offload query plan 114, which may be necessary if results among nodes 118-122 depend upon each other. Such restarting may entail aborting any previous and still ongoing execution of offload query plan 114. Such restarting need not entail resending respective data fragments 126 to surviving participating nodes 118, 120 because respective data fragment may be locally retained despite a query restart. In this way, DBMS 102 may resubmit multiple queries for execution across various nodes without re-loading data fragments to each node, which helps to accelerate query restart.

In an embodiment, at block 416, DBMS 102 checks a state corresponding to the NRS of the failed node to determine if the query is affected and even needs to be resubmitted. For instance, if a failed node already sent an EOT message to DBMS 102, the failure may be ignored, and no re-submission is required. This is because complete result data has already been received for the failed.

After performing processes of block 414 and block 416, DBMS 102 at block 410 receives results of successful distributed execution of offload query plan 114, including a complete local result 216 from computing node 122, which replaced failed node 116. Each of surviving participating nodes 118, 120 may also send a respective local result 210, 212 to DBMS 102. DBMS 102 may combine or otherwise process the received local results. Restarting execution of offload query plan 114 means that repeated distributed execution attempts by surviving participating nodes 118, 120 and replacement node 122 may cause a local result to be generated and sent multiple times. DBMS 102 may disregard a duplicate local result by discarding, at block 414 and/or block 416, result data sets in result buffers 130 that had not been completed or sent to a parent node or to client application 104 in response to a previous submission of the query (e.g., previous to resubmitting the query at block 416). So, from the point-of-view of the query client application, result data from buffers 130 are either completely forwarded to the foreground process or not forwarded at all.

As discussed above, at block 412, DBMS 102 releases one or more portions of received result data sets to a parent node in query plan 114 or to client application 104. However, in the example where DBMS 102 has detected an error at node 116 and resubmitted query plan 114 for execution by replacement node 122, DBMS 102 is configured to ensure that duplicate results data sets are not returned to client application 104. According to an embodiment, DBMS 102 checks state machines corresponding to result data sets in result buffers 130 to determine whether result data sets or a portion thereof have been released to client application 104. If no portion of a result data set has been released when DBMS 102 detects a failure, then DBMS 102 discards result data accumulated so far and resubmits the query. In this case, all of the result data received after resubmitting the query to replacement node 122 may be released from result buffer to client application.

If DBMS checks 102 state machines corresponding to result data sets in result buffers 130 and determines that a portion of a result data set has been released when DBMS 102 detects a failure, DBMS 102 is configured to discard such portions of the result data set from result data received at block 410 from replacement node 122. DBMS 102 may then release to client application 104 the remaining result data from replacement node 122.

So, from the point-of-view of client application 104, the result-set buffers are either completely forwarded to the foreground process 112 or not forwarded at all. Foreground process 112 sends to client application 104 only the result data sets (in result buffers 130) for computing nodes that did not send respective result data sets during a previous submission of the query for processing and execution. In an embodiment, the re-submission of a query causes other computing nodes to produce respective result data sets, and in this case, the foreground process also discards or otherwise disregards result data sets (in result buffers 130) that have already been passed to the query client during a previous submission of the query.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11$g$. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
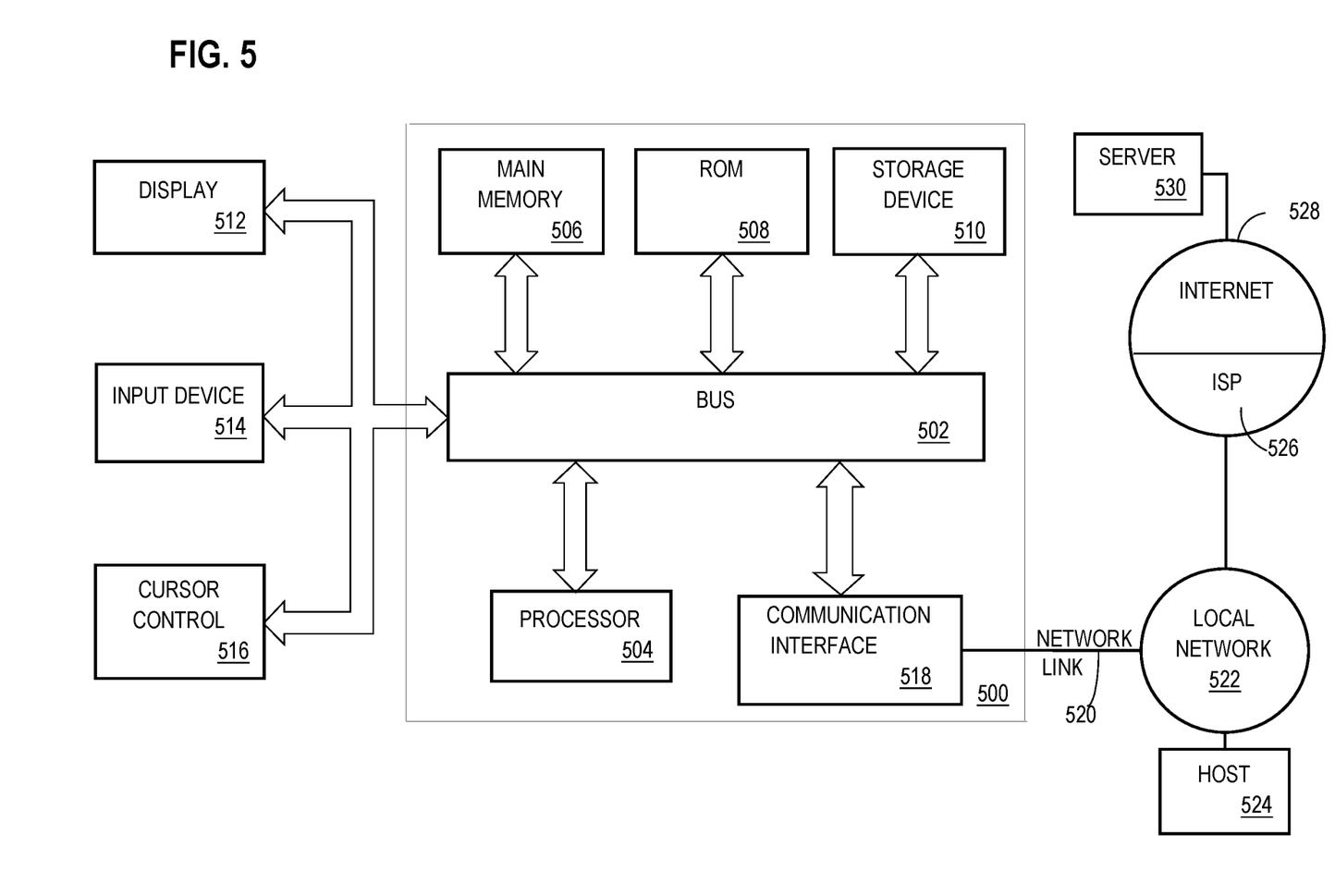
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
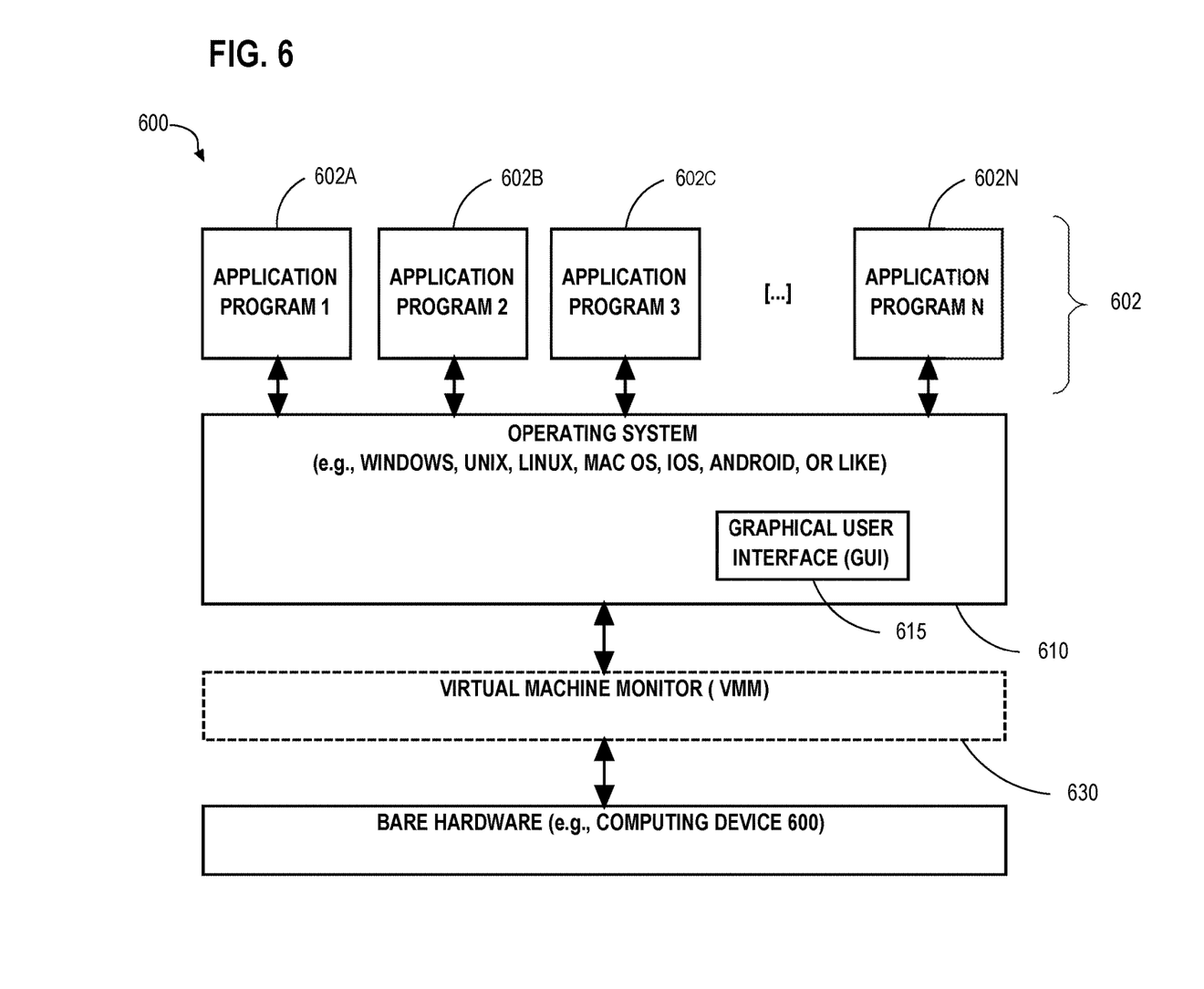
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, by a database management system (DBMS), a query from a client;
   determining a query plan for the query, wherein the query plan comprises a graph of interlinked plan nodes the include a particular plan node and a parent plan node of said particular plan node;
   executing the query plan, wherein executing the query plan includes executing the particular plan node, wherein executing the particular plan node comprises:
      sending a plurality of query operators to a plurality of computing nodes for the plurality of computing nodes to execute the plurality of query operators on a plurality of data fragments of a database of said DBMS, wherein each computing node of the plurality of computing nodes hosts a respective data fragment of the plurality of data fragments;
      detecting an error in execution of a first query operator of the plurality of query operators by a first computing node of the plurality of computing nodes on a first data fragment of the database of the plurality of data fragments of the database; and
      in response to detecting the error in executing the first query operator by the first computing node on the first data fragment of the database:
         sending the first data fragment of the database to a replacement computing node;
         sending the first query operator to said replacement computing node for executing on the first data fragment of the database sent to said replacement computing node;
         in response to releasing any of said first results generated by execution of said first query operator by said first computing node to said parent plan node, discarding at least a portion of said first results.

2. The method of claim 1, further comprising:
   determining a first logical node associated with the first computing node; and
   associating, in response to detecting the error in executing the first query operator by the first computing node on the first data fragment of the database, the first logical node with the replacement computing node.

3. The method of claim 1, further comprising:
   receiving a first set of result data from the first computing node, the first set of result data generated by the first computing node in executing the first query operator on the first data fragment of the database;
   storing the first set of result data in a first buffer, wherein the first buffer is allocated to a first logical node, wherein the first logical node is associated with the first computing node prior to sending the first query operator to the replacement computing node; and
   releasing one or more portions of the first set of result data to one or more of a parent plan node of the query plan or to the client.

4. The method of claim 3, further comprising:
   receiving a second set of result data from the replacement computing node, the second set of result data generated by the replacement computing node in executing the first query operator on the first data fragment of the database;
   storing the second set of result data in the first buffer, wherein the first buffer is allocated to the first logical node, wherein the first logical node is associated with the replacement computing node rather than with the first computing node after sending the first query operator to the replacement computing node;
   determining a third set of result data comprising the second set of result data without the one or more portions of the first set of result data released to one or more of the parent plan node of the query plan or to the client; and
   releasing the third set of result data to one or more of the parent plan node of the query plan or to the client.

5. The method of claim 1, wherein the method further includes:
   receiving result data generated by the plurality of computing nodes in executing the plurality of query operators; and
   storing received result data in plurality of buffers allocated to the plurality of computing nodes, wherein each of the computing nodes of the plurality of computing nodes is allocated a respective buffer of the plurality of buffers, and wherein result data from a particular computing node of the plurality of computing nodes is segregated in a respective buffer allocated to the particular computing node.

6. The method of claim 1, wherein executing the particular plan node comprises:
   detecting a second error in executing a second query operator of the plurality of query operators by a second computing node of the plurality of computing nodes on a second data fragment of the plurality of data fragments of the database;
   determining that a complete set of result data has been received from the second computing node, the complete set of result data generated by the second computing node in executing the second query operator on the second data fragment; and in response to determining that the complete set of result data has been received from the second computing node, releasing the complete set of result data to said parent plan node in the query plan or the client.

7. The method of claim 1, wherein the DBMS is connected to the plurality of computing nodes via a network.

8. The method of claim 1, wherein different computing nodes of the plurality of computing nodes host different data fragments of the plurality of data fragments of the database, and wherein the plurality of computing nodes together entirely host the database.

9. One or more non-transitory computer-readable storage medium storing instructions that, when executed by one or more processors, cause the one or more processors to perform functions comprising:
receiving, by a database management system (DBMS), a query from a client;
determining a query plan for the query, wherein the query plan comprises a graph of interlinked plan nodes the include a particular plan node and a parent plan node of said particular plan node;
executing the query plan, wherein executing the query plan includes executing the particular plan node, wherein executing the particular plan node comprises:
sending a plurality of query operators to a plurality of computing nodes for the plurality of computing nodes to execute the plurality of query operators on a plurality of data fragments of a database of said DBMS, wherein each computing node of the plurality of computing nodes hosts a respective data fragment of the plurality of data fragments;
detecting an error in execution of a first query operator of the plurality of query operators by a first computing node of the plurality of computing nodes on a first data fragment of the database of the plurality of data fragments of the database; and
in response to detecting the error in executing the first query operator by the first computing node on the first data fragment of the database:
sending the first data fragment of the database to a replacement computing node;
sending the first query operator to said replacement computing node for executing on the first data fragment of the database sent to said replacement computing node;
in response to releasing any of said first results generated by execution of said first query operator by said first computing node to said parent plan node, discarding at least a portion of said first results.

10. The one or more non-transitory computer-readable storage medium of claim 9, wherein the functions further comprise:
determining a first logical node associated with the first computing node; and
associating, in response to detecting the error in executing the first query operator by the first computing node on the first data fragment of the database, the first logical node with the replacement computing node.

11. The one or more non-transitory computer-readable storage medium of claim 9, wherein the functions further comprise:
receiving a first set of result data from the first computing node, the first set of result data generated by the first computing node in executing the first query operator on the first data fragment of the database;
storing the first set of result data in a first buffer, wherein the first buffer is allocated to a first logical node, wherein the first logical node is associated with the first computing node prior to sending the first query operator to the replacement computing node; and
releasing one or more portions of the first set of result data to one or more of a parent plan node of the query plan or to the client.

12. The one or more non-transitory computer-readable storage medium of claim 11, wherein the functions further comprise:
receiving a second set of result data from the replacement computing node, the second set of result data generated by the replacement computing node in executing the first query operator on the first data fragment of the database;
storing the second set of result data in the first buffer, wherein the first buffer is allocated to the first logical node, wherein the first logical node is associated with the replacement computing node rather than with the first computing node after sending the first query operator to the replacement computing node;
determining a third set of result data comprising the second set of result data without the one or more portions of the first set of result data released to one or more of the parent plan node of the query plan or to the client; and
releasing the third set of result data to one or more of the parent plan node of the query plan or to the client.

13. The one or more non-transitory computer-readable storage medium of claim 9, wherein the functions further comprise:
receiving result data generated by the plurality of computing nodes in executing the plurality of query operators; and
storing received result data in plurality of buffers allocated to the plurality of computing nodes, wherein each of the computing nodes of the plurality of computing nodes is allocated a respective buffer of the plurality of buffers, and wherein result data from a particular computing node of the plurality of computing nodes is segregated in a respective buffer allocated to the particular computing node.

14. The one or more non-transitory computer-readable storage medium of claim 9, wherein executing the particular plan node comprises:
detecting a second error in executing a second query operator of the plurality of query operators by a second computing node of the plurality of computing nodes on a second data fragment of the plurality of data fragments of the database;
determining that a complete set of result data has been received from the second computing node, the complete set of result data generated by the second computing node in executing the second query operator on the second data fragment; and
in response to determining that the complete set of result data has been received from the second computing node, releasing the complete set of result data to said parent plan node in the query plan or the client.

* * * * *